(12) United States Patent
Ishigami et al.

(10) Patent No.: US 9,361,668 B2
(45) Date of Patent: Jun. 7, 2016

(54) METHOD AND APPARATUS FOR GENERATING DISPARITY MAP

(71) Applicants: DENSO CORPORATION, Kariya, Aichi-pref. (JP); NIPPON SOKEN, INC., Nishio, Aichi-pref. (JP); TOYOTA JIDOSHA KABUSHIKI KAISHA, Toyota-shi, Aichi-ken (JP)

(72) Inventors: Hirotake Ishigami, Nishio (JP); Noriaki Shirai, Chiryu (JP); Masayuki Imanishi, Okazaki (JP); Yoshinao Takemae, Yokohama (JP)

(73) Assignees: DENSO CORPORATION, Kariya, Aichi-pref. (JP); NIPPON SOKEN, INC., Nishio, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/422,502

(22) PCT Filed: Aug. 20, 2013

(86) PCT No.: PCT/JP2013/072156
§ 371 (c)(1),
(2) Date: Feb. 19, 2015

(87) PCT Pub. No.: WO2014/030630
PCT Pub. Date: Feb. 27, 2014

(65) Prior Publication Data
US 2015/0228057 A1 Aug. 13, 2015

(30) Foreign Application Priority Data
Aug. 20, 2012 (JP) ................ 2012-181587

(51) Int. Cl.
*G06K 9/40* (2006.01)
*G06T 5/00* (2006.01)
(Continued)

(52) U.S. Cl.
CPC . *G06T 5/001* (2013.01); *G06T 5/20* (2013.01); *G06T 7/0075* (2013.01); *G06T 2207/10012* (2013.01); *G06T 2207/20228* (2013.01)

(58) Field of Classification Search
CPC ....... G06T 1/10; G06T 2200/04; G06T 19/20; G06T 2207/20228; G06T 2207/10024; G06T 2207/10012; G06T 2207/10021; G06T 7/0075; H04N 13/0022; H04N 13/0033; H04N 13/02; H04N 2013/0081
USPC .......................................................... 382/274
See application file for complete search history.

(56) References Cited

U.S. PATENT DOCUMENTS

2002/0048395 A1* 4/2002 Harman ................ G06T 7/0053
382/154

(Continued)

FOREIGN PATENT DOCUMENTS

| JP | H09-027969 | 1/1997 |
| JP | 2001-351200 | 12/2001 |

(Continued)

OTHER PUBLICATIONS

International Search Report (in Japanese with English Translation) for PCT/JP2013/072156, mailed Oct. 8, 2013.
(Continued)

*Primary Examiner* — Ali Bayat
(74) *Attorney, Agent, or Firm* — Harness, Dickey & Pierce, P.L.C.

(57) ABSTRACT

There is provided an apparatus for generating a disparity map. According to the apparatus, an image acquisition section acquires a right-camera image and a left-camera image which are picked up from mutually different viewpoints by cameras. A disparity map generation section generates a disparity map that includes disparity expressed in terms of a difference in pixel positions between each of pixels and a corresponding one of pixels in the right-camera image and the left-camera image, respectively, as acquired. A weight determination section determines a weight that serves as a degree of contribution to disparity correction, for each of weight-calculation-target pixels composed of surrounding pixels. The weight-calculation-target pixels include a correction-target pixel or surrounding pixels that are present around the correction-target pixel in the disparity map. A disparity map correction section corrects the disparity of the correction-target pixel, using weighted average based on the determined weight.

17 Claims, 5 Drawing Sheets

(51) Int. Cl.
*G06T 7/00* (2006.01)
*G06T 5/20* (2006.01)

(56) References Cited

U.S. PATENT DOCUMENTS

| | | | | |
|---|---|---|---|---|
| 2005/0232509 | A1* | 10/2005 | Blake | G06K 9/03 382/275 |
| 2005/0232510 | A1* | 10/2005 | Blake | G06T 5/50 382/275 |
| 2005/0286756 | A1* | 12/2005 | Hong | G06K 9/20 382/154 |
| 2011/0234765 | A1 | 9/2011 | Tanaka | |
| 2011/0273531 | A1 | 11/2011 | Ito et al. | |
| 2012/0069009 | A1 | 3/2012 | Shimoyama et al. | |
| 2014/0009462 | A1* | 1/2014 | McNamer | G06T 19/20 345/419 |

FOREIGN PATENT DOCUMENTS

| | | |
|---|---|---|
| JP | 2003-209858 | 7/2003 |
| JP | 2011-124935 | 6/2011 |
| JP | 2011-203811 | 10/2011 |
| JP | 2013-164351 | 8/2013 |
| WO | 2011/033673 A1 | 3/2011 |

OTHER PUBLICATIONS

International Preliminary Report on Patentability (in Japanese with English Translation) for PCT/JP2013/072156, issued Feb. 24, 2015.
"Depth Map Refinement with Weighted Joint Bilateral Filter" by Takuya Matsumoto et al., 74th annual conference of Information Processing Society of Japan with spot translation.
"Depth Map Post-Filtering for Depth Image Based Rendering" by Norishige Fukushima et al., D vol. J94-D, No. 12, pp. 1992-1995, Journal of Institute of Electronics, Information and Communication Engineers with spot translation.
Office Action dated Feb. 2, 2016 issued in the corresponding JP application No. 2012-181587 in Japanese with English translation.
T. Matsuo et al., "Weighed joint bilateral filter for improving depth estimation accuracy," 74th National Convention of Information Processing Societies, Collection of preliminary manuscripts 2012-10004-116.
N. Fukushima et al., "Post filtering for depth image, for depth image based rendering," Journal of Institute of Electronics, Information and Communication Engineers, pp. 1992-1995, J94-D vol., Dec. 1, 2011.

* cited by examiner

METHOD AND APPARATUS FOR GENERATING DISPARITY MAP

CROSS REFERENCE TO RELATED APPLICATIONS

This application is a U.S. National Phase Application under 35 U.S.C. 371 of International Application No. PCT/JP2013/072156 filed on Aug. 20, 2013 and published in Japanese as WO 2014/030630 A1 on Feb. 27, 2014. This application is based on and claims the benefit of priority from Japanese Patent Application No. 2012-181587 filed Aug. 20, 2012. The entire disclosures of all of the above applications are incorporated herein by reference.

BACKGROUND

1. Technical Field

The present invention relates to a method and an apparatus for generating a disparity map, and in particular relates to a method and apparatus for generating a disparity map that includes disparities each expressed in terms of the difference in pixel position between corresponding pixels in a plurality of images that are acquired from mutually different viewpoints.

2. Background Art

A disparity map generation apparatus as mentioned above is described in Patent Literature 1. According to this apparatus, in correcting a disparity of a pixel, those pixels which are analogous in color to the pixel to be corrected are extracted from a group of pixels around the pixel to be corrected. Then, a histogram of disparities of the extracted group of pixels is prepared, and a disparity that is a mode value of the prepared histogram is used as the disparity of the pixel to be corrected.

Patent Literature JP-A-2011-203811

TECHNICAL PROBLEM

However, the method of correction using a histogram as mentioned above has a problem as described below. In the first place, a mode value of a histogram is required to be determined. Accordingly, the width of a bin range is required to be increased to some extent. As a result, the value of a disparity after correction becomes unavoidably approximate in accordance with the width of the bin range. As a result, for example, an object which in fact is continuously arranged in a three-dimensional space (e.g., a white line on a road) has a probability of being judged as being discontinuously arranged.

SUMMARY

Hence, it is desired that, in correcting a disparity map, the value of a disparity after correction is ensured to be more precise despite being divided into bins.

An exemplary embodiment provides a disparity map generation apparatus, characterized in that the apparatus comprises: an image acquiring means for acquiring a first image and a second image which are picked up from mutually different viewpoints by cameras respectively; a disparity map generating means for generating a disparity map that includes disparity expressed in terms of a difference in pixel positions between each of pixels and a corresponding one of pixels in the first image and the second image, respectively, as acquired; a weight determining means for determining a weight that serves as a degree of contribution to disparity correction, for a correction-target pixel or weight-calculation-target pixels composed of surrounding pixels that are present around the correction-target pixel; and a disparity map correcting means for correcting the disparity of the correction-target pixel, using a weighted average based on the determined weight.

Thus, since a method using weighted average is used as a method for correction, the value of the disparity after correction is prevented from becoming rough depending on bins. In the exemplary embodiment, information processing is specifically conducted on the basis of the physical properties (that are picked up by cameras from mutually different viewpoints) of objects (images).

Further, according to the exemplary embodiment, a disparity map generation method that has the functions described above is also provided.

The bracketed reference signs in the above description and the claims indicate correlation of the terms recited in the claims with the specific objects or the like to exemplify these terms used in the embodiments described later.

DESCRIPTION OF EMBODIMENTS

With references to the accompanying drawings, hereinafter is described an apparatus for generating a disparity map and a generation method therefor, according to an embodiment of the present invention.

Figure 1:
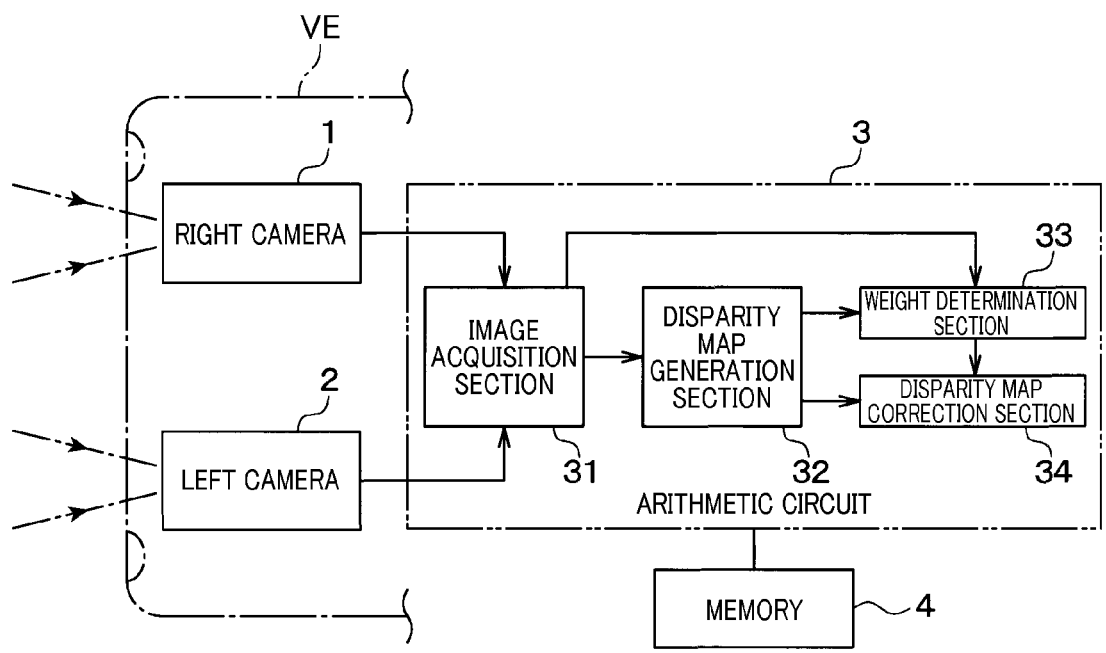
FIG. 1 is a block diagram illustrating a disparity map generation system related to an embodiment of the present invention.

As shown in FIG. 1, a disparity map generation system related to the present embodiment includes a right camera 1, a left camera 2, an arithmetic circuit 3, and a memory 4. The disparity map generation system implements the apparatus for generating a disparity map and a generation method therefor related to the present invention.

The right camera 1 and the left camera 2 are arranged at mutually different positions and ensured to concurrently pick up an image of the same subject from mutually different viewpoints. Let us take, as an example, the case where the disparity map generation system is installed in a vehicle VE. In this case, the right and left cameras 1 and 2 may be mounted near the right and left ends, respectively, of the windshield of the vehicle VE, and the right and left cameras 1 and 2 may be both ensured to pick up images ahead of the vehicle. An object in which the disparity map generation system is installed is not construed to be limited to a vehicle, but may be any object that requires a disparity map, and thus may be devices or systems other than vehicles.

The arithmetic circuit 3 (corresponding to an example of the disparity map generation apparatus) is an apparatus that acquires images picked up by the right camera 1 and the left camera 2, and prepares a disparity map on the basis of the acquired images. The arithmetic circuit 3 is ensured to execute a program recorded in a ROM of a memory 4 (i.e., a non-transitory computer readable medium) to realize a process shown in FIG. 2 described later. In performing the process shown in FIG. 2, the arithmetic circuit 3 uses a RAM of the memory 4 as a work area in which calculation results are temporarily stored.

Figure 2:
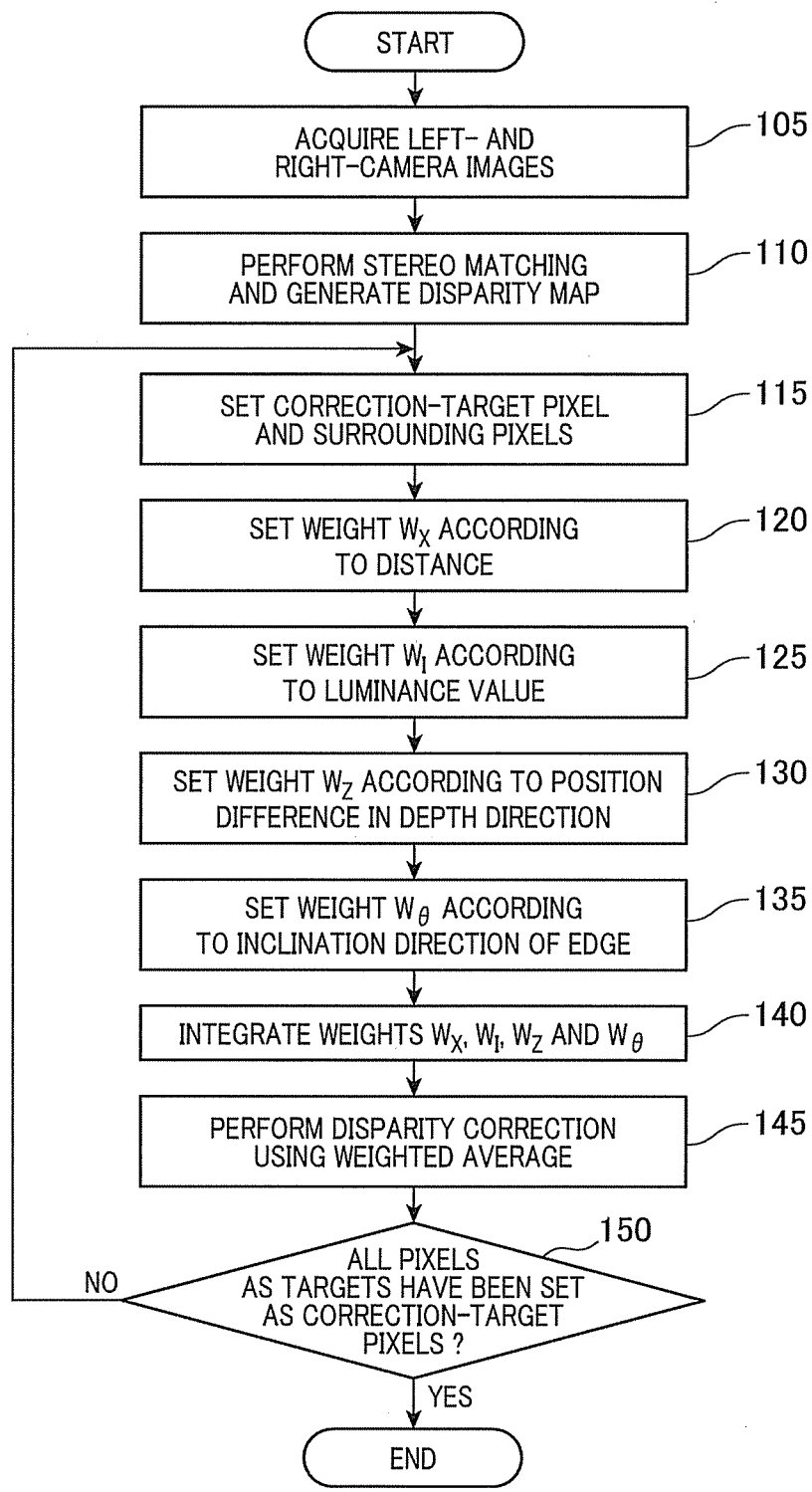
FIG. 2 is a flow chart illustrating a process executed by an arithmetic circuit.

Further, the arithmetic circuit 3 performs the process shown in FIG. 2 to function as an image acquirement section 31, a disparity map generation section 32, a weight determination section 33, and a disparity map correction section 34.

The image acquirement section 31 acquires two images picked up from different viewpoints by the right camera 1 and the left camera 2. The disparity map generation section 32 generates a disparity map that includes disparities each expressed in terms of the difference in pixel position between each of pixels and a corresponding one of pixels in the respective two images as acquired.

The weight determination section 33 determines a weight as a degree of contribution to correction, for a correction-target pixel 41 (sequentially selected one by one) and surrounding pixels that are present in the vicinity of the correction-target pixel in a disparity map. The disparity map correction section 34 corrects the disparity of a correction-target pixel using a weighted average on the basis of the determined weight.

Hereinafter is described a process shown in FIG. 2. In the process shown in FIG. 2, the arithmetic circuit 3 acquires first, at step 105, a right-camera image (corresponding to an example of the first image) picked up by the right camera 1 and a left-camera image (corresponding to an example of the second image) picked up by the left camera 2, for storage in the RAM of the memory 4. By performing step 105, the arithmetic circuit 3 functions as the image acquisition section 31.

Then, at step 110, using the right-camera image and the left-camera image recorded on the RAM, known stereo matching is performed to generate a disparity map. By performing step 110, the arithmetic circuit 3 functions as the disparity map generation section 32.

At step 110, a disparity is calculated as a difference (divergence amount) between the positions of pixels in a lateral direction in the right-camera image and the left-camera image, the pixels being of the same subject included in both of the right-camera image and the left-camera image.

Figure 3:
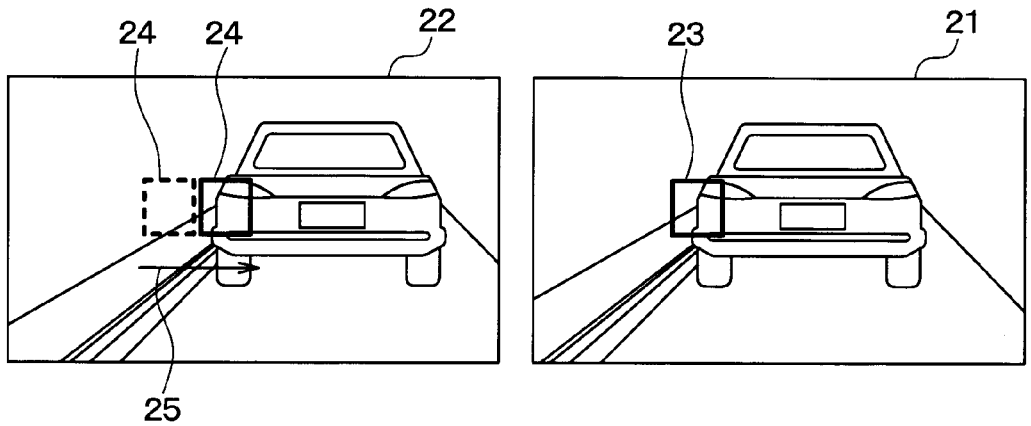
FIG. 3 is a diagram schematically illustrating stereo matching.

The stereo matching used is a known block matching method. In the block matching method, as shown in FIG. 3, the arithmetic circuit 3 sets, in the right-camera image 21, a mark block 23 (e.g., block of pixels arranged in 5 rows×5 columns) that includes a mark pixel at the center. Then, the arithmetic circuit 3 searches through the left-camera image 22 for a block that includes the same subject as in the mark block 23, and extracts the block that has been extracted as a result of the search, followed by correlating a center pixel of the drawn block with the mark pixel. A series of these processes are repeated while shifting the position for a mark pixel by raster scanning on a pixel-by-pixel basis until all the pixels in the right-camera image 21 have been searched as the mark pixels.

In this case, in order to search for a block that includes the same subject as in the mark block 23, a plurality of comparison blocks 24 (each having the same shape and size as the mark block) as candidates are provided to a plurality of positions in the left-camera image 22. Of the comparison blocks 24, the one with a minimum known SAD (Sum of Absolute Difference) (i.e. a comparison block having a highest correlation with the mark block 23) is selected as a block that includes the same subject as in the mark block 23. It should be noted that the SAD refers to a sum of absolute values of luminance differences, each of which is a difference in luminance between each of pixels and a corresponding one of pixels in the respective two blocks (the mark block and the comparison block).

The plurality of comparison blocks 24 are selected from among only those blocks which each have a center pixel whose vertical level in the image coordinate (corresponding to a vertical level in FIG. 3) in the left-camera image 22 coincides with the vertical level of the mark pixel in the right-camera image. In other words, the block that includes the same subject as in the mark block 23 is searched in a horizontal direction as indicated by an arrow 25. Accordingly, the pixel corresponding to the mark pixel is also searched in a horizontal direction at the same vertical level as the mark pixel.

As described above, through the block matching, for each of the pixels in the right-camera image 21, a corresponding one of the pixels in the left-camera image 22 is determined. Based on this, for each of the pixels in the right-camera image 21, a disparity relative to a corresponding one of the pixels in the left-camera image 22 (difference between image coordinate positions in a lateral direction) is calculated. The calculated disparity is recorded on the RAM of the memory 4, as a disparity corresponding to a pixel in the right-camera image 21.

In this way, disparity data are recorded being correlated to the individual pixels in the right-camera image 21, and the data serve as a disparity map. Specifically, the disparity map corresponds to data in which the disparities of the subject captured in the pixels of the right-camera image 21 are correlated to the coordinates of the respective pixels in the image.

Subsequent to step 110, processings of steps 115 to 150 are repeated by the number of times equal to the number of pixels of the disparity map. At step 115 in each cycle of the repetition, a correction-target pixel and a plurality of surrounding pixels are newly set for the cycle.

Figure 4:
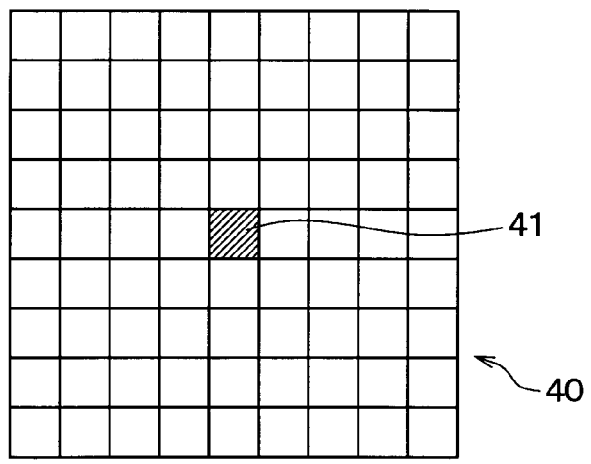
FIG. 4 is a diagram illustrating a correction-target pixel and a surrounding image in a disparity map.

As shown in FIG. 4, a block area 40 is set, which is composed of 9-row×9-column dots centering on a correction-target pixel 41. In the block, the plurality of surrounding pixels correspond to the pixels that have remained after removal of the correction-target pixel 41 from all the pixels in the block area 40. It should be noted that the size and shape of the block area 40 may be appropriately changed.

At the subsequent steps 120, 125, 130 and 135, various weights are set for the correction-target pixel 41 and each of the surrounding pixels. The set weights are each used as an amount indicating a degree of contribution to correction in correcting the disparity of the correction-target pixel 41 using a weighted average at step 145 described later.

First, at step 120, a first weight Wx is set for the correction-target pixel 41 and each of the surrounding pixels. The weight $W_X$ is set according to a distance, on the image coordinate, from a pixel targeted to calculation of a weight (the correction-target pixel 41 or the surrounding pixel; hereinafter referred to as "weight-calculation-target pixel") to the correction-target pixel 41. As indicated by an arrow 42 in FIG. 5, a position more distanced from the correction-target pixel 41 in the block area 40 in the right-camera image 21, makes longer the distance, on the image coordinate, from a weight-calculation-target pixel at the position to the correction-target pixel 41.

Figure 5:
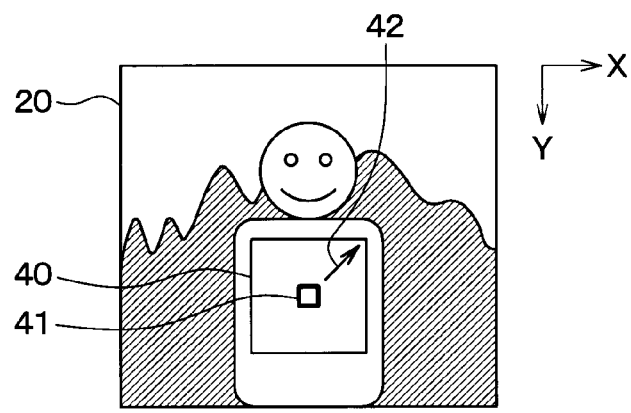
FIG. 5 is a diagram conceptually illustrating weight setting according to a distance between a correction-target pixel and a weight-calculation-target pixel on an image coordinate.
Figure 6:
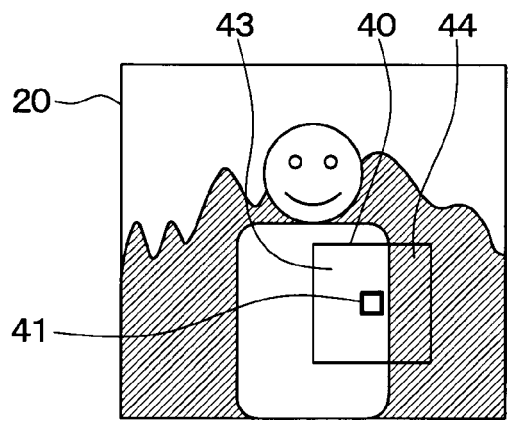
FIG. 6 is a diagram conceptually illustrating significance of weight setting according to a luminance difference between a correction-target pixel and a weight-calculation-target pixel on an image coordinate.

Specifically, when an image coordinate value of the correction-target pixel 41 is (x, y) and an image coordinate value of a weight-calculation-target pixel is (x',y') on an image coordinate (X, Y) as shown in FIG. 5, weight setting is expressed by:

$$W_X(x, y, x', y') \exp\left(-\frac{(x-x')^2 + (y-y')^2}{2\sigma_x^2}\right) \quad \text{Math. 1}$$

Figure 7:
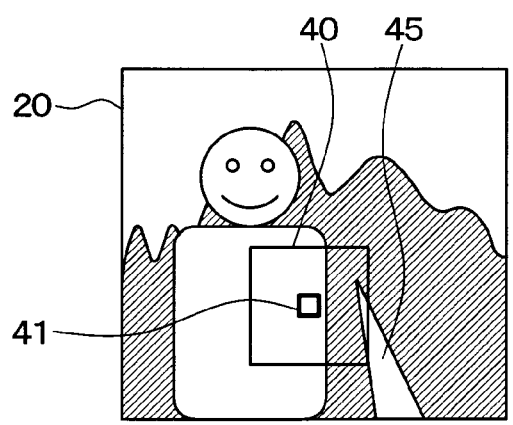
FIG. 7 is a diagram conceptually illustrating significance of weight setting according to a difference in position in depth direction between a correction-target pixel and a weight-calculation-target pixel on an image coordinate.

At the subsequent step 125, a second weight $W_I$ is set for the correction-target pixel 41 and each of the surrounding pixels. The weight $W_I$ is set according to a difference in a luminance value between a weight-calculation-target pixel and the correction-target pixel 41 (difference between luminance values in the right-camera image 21). As shown in FIG. 7, the correction-target pixel 41 includes a part of a human body as a subject. As shown in the figure, in the block area 40, the luminance of an area 43 containing a human body is obviously different from the luminance in an area 44 containing the background. In such a case, making use of the difference in luminance, the disparity of the background that is not so relevant to the disparity of the correction-target pixel 41 is permitted to have a low degree of contribution in performing disparity correction calculation for the correction-target pixel 41.

Specifically, when the luminance value of the correction-target pixel 41 (in the right-camera image 21) is represented by $I_{xy}$, and the luminance value of a weight-calculation-target pixel (in the right-camera image 21) is represented by $I_{x'y'}$, the calculation is as follows:

$$W_I(I_{xy}, I_{x'y'}) = \exp\left(-\frac{(I_{xy} - I_{x'y'})^2}{2\sigma_I^2}\right) \quad \text{Math. 2}$$

Specifically, as the difference between the luminance value of the correction-target pixel 41 and the luminance value of a weight-calculation-target pixel becomes larger, the weight $W_I$ of the weight-calculation-target pixel is permitted to be lighter. It should be noted that $\sigma_I$ is a preset constant.

At the subsequent step 130, a third weight $W_Z$ is set for the correction-target pixel 41 and each of the surrounding pixels. The weight $W_Z$ is set according to a difference in position in a depth direction, between a weight-calculation-target pixel and the correction-target pixel 41 when converted to a three-dimensional coordinate. As shown in FIG. 7, the correction-target pixel 41 includes a part of a human body as a subject. As shown in the figure, the block area 40 may include a subject 45 (e.g., white line on a road surface) which has a luminance close to that of the human body, but of which the distances from the cameras 1 and 2 thereto are greatly different from each other. In such a case, making use of the difference in distance from the cameras 1 and 2 (i.e. the positions in a depth direction), the disparity of the subject 45 that is not so relevant to the disparity of the correction-target pixel 41 is permitted to have a low degree of contribution in performing disparity correction calculation for the correction-target pixel 41.

Specifically, when the position in a depth direction of the correction-target pixel 41 is represented by $Z_{xy}$, and the position in a depth direction of a weight-calculation-target pixel is represented by $Z_{x'y'}$, the calculation is as follows:

$$X_Z(Z_{xy}, Z_{x'y'}) = \exp\left(-\frac{(Z_{xy} - Z_{x'y'})^2}{s\sigma_Z^2}\right) \quad \text{Math. 3}$$

Specifically, as the difference between a position (whose value becomes larger as distanced from a camera) in a depth direction of the correction-target pixel 41 and the position in a depth direction of a weight-calculation-target pixel becomes larger, the weight $W_Z$ of the weight-calculation-target pixel is permitted to be lighter. It should be noted that $\sigma_Z$ is a preset constant.

Figure 8:
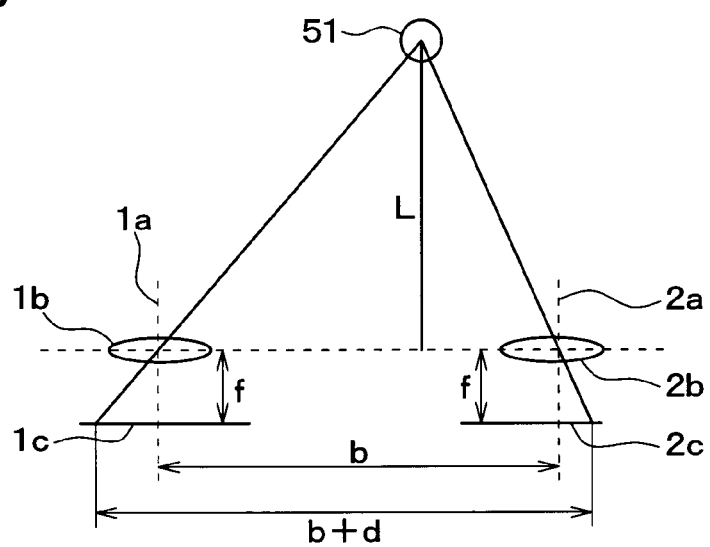
FIG. 8 is a diagram illustrating a relationship between a depth-direction position L and a disparity d.

It should be noted that the position of a pixel in a depth direction when converted to a three-dimensional coordinate depends on the disparity of the pixel (the disparity calculated at immediately preceding step 110). Specifically, as shown in FIG. 8, b represents a distance between optical axes 1a and 1b of the two cameras 1 and 2, respectively, f represents a lens focal length that corresponds to a distance from a lens 1b of the camera 1 to an image-formed surface 1c (the distance is equal to the distance from a lens 2b of the camera 2 to an image-formed surface 2c), and d represents a disparity. In this case, a position L in a depth direction of a subject 51 is obtained through a formula L=b×f/d. It should be noted that the focal length f and the distance b are datums.

Accordingly, when there is a large difference in position in a depth direction, between two pixels, the difference in disparity between the two pixels also becomes large. Therefore, as the difference between the disparity of the correction-target pixel 41 and the disparity of a weight-calculation-target pixel becomes larger, the weight $W_Z$ of the weight-calculation-target pixel becomes lighter.

At the subsequent step 135, a fourth weight $W_\theta$ is set for the correction-target pixel 41 and each of the surrounding pixels.

Figure 9:
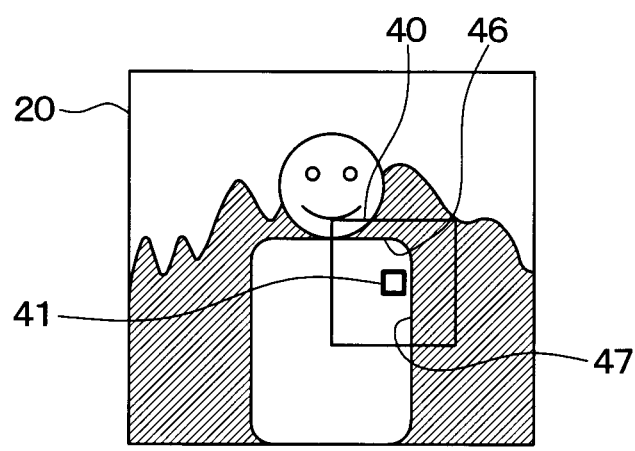
FIG. 9 is a diagram conceptually illustrating weight setting according to an inclination of an edge of a weight-calculation-target pixel.

The weight $W_\theta$ is set according to an inclination of an edge that is present in a weight-calculation-target pixel (edge in the right-camera image 21). Specifically, as a pixel has an edge whose inclination is more approximate to a horizontal level, the $W_\theta$ is permitted to be lighter. Accordingly, as shown in FIG. 9, the pixel at a position of an edge 46 has a weight lighter than the weight of the pixel at a position of an edge 47.

More specifically, when an inclination of an edge in the correction-target pixel 41 is represented by $\theta_{x'y'}$ ($\theta_{x'y'}$ is determined in a range $0 \leq \theta_{x'y'} < \pi$), the calculation is as follows:

$$W_\theta(\theta_{x'y'}) = \exp\left(-\frac{(\pi/2 - \theta_{x'y'})^2}{2\sigma_\theta^2}\right) \quad \text{Math. 4}$$

It should be noted that $\sigma_\theta$ is a preset constant.

The reason why the fourth weight $W_\theta$ is calculated in this way is that a weight-calculation-target pixel with an edge more approximate to a horizontal level tends to cause a larger error in the disparity calculation based on stereo matching at step 110, and that the degree of contribution of such a weight-calculation-target pixel is desired to be lowered in the disparity correction calculation for the correction-target pixel 41.

Hereinafter is described the reason why a pixel with an edge more approximate to a horizontal level causes a larger error in stereo matching. In the present embodiment, two pixels that have taken the same subject in the respective right- and left-camera images are positionally offset in a horizontal direction, but are ensured not to be positionally offset in a vertical direction by adjusting in advance the positions and the orientations of the cameras 1 and 2.

Further, in order to detect a slight offset in the positions and the orientations of the cameras 1 and 2, the arithmetic circuit 3 carries out calibration using the right- and left-camera images in setting up the cameras 1 and 2. The arithmetic circuit 3 then determines correction parameters for the right- and left-camera images so as to eliminate the offset detected through the calibration. Thereafter, at step 105 of every cycle, the arithmetic circuit 3 applies correction, using the correction parameters, to the latest right- and left-camera images.

Figure 10:
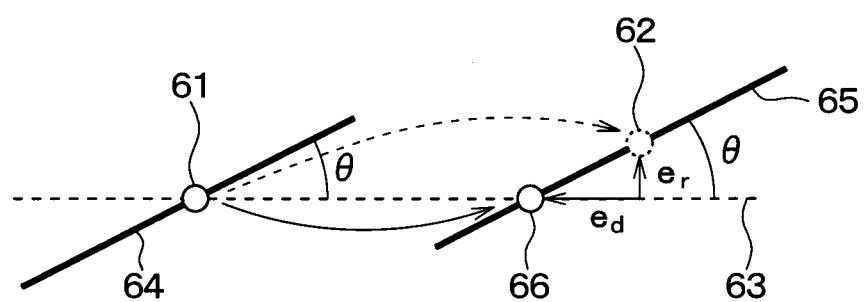
FIG. 10 is a diagram illustrating a relationship between an inclination of an edge and a disparity error $e_d$.

However, an error can occur in the calibration. In such a case, as shown in FIG. 10, a pixel 61 in which a subject is taken in the right-camera image, and a pixel 62 in which the same subject is taken in the left-camera image are not necessarily on the same horizontal line 61 (i.e. vertically offset). In the example shown in FIG. 10, the pixel 61 is on an edge 61 in the right-camera image, while the pixel 62 is on an edge 62 (which is equal to the edge 61 for the subject) in the left-camera image.

In such a case as well, in the stereo matching performed at step 110, a pixel corresponding to the mark pixel is horizontally searched at the same vertical level as the mark pixel, as described above. Accordingly, the pixel 62 truly corresponding to the pixel 61 will never be correlated in fact to the pixel 61.

In such a case, the pixel actually correlated, in the left-camera image, to the pixel 61 has a high probability of being a pixel 66 located at a position where the horizontal line 63 intersects the edge 65 passing through the pixel 62, due to the nature of the block matching. As a result, the disparity calculated for the pixel 61 unavoidably includes a disparity error $e_d$.

When $\theta$ represents the inclination of the edges 61 and 62 relative to a horizontal line, and $e_r$ represents a parallelization error that is a vertical offset of the pixel 61 relative to the pixel 62, the disparity error $e_d$ is expressed as follows in a coordinate system in which the origin is at an upper-left end of image (in the example shown in FIG. 10, $e_d$ and $e_r$ each have a minus value):

$$e_d = e_r \times \tan(\pi/2 - \theta)$$

Specifically, in a range of $0 \leq \theta \leq \pi$, the disparity error $e_d$ is minimum when $\theta = \pi/2$ is satisfied (i.e. when the edge is perpendicular to the horizontal line), but becomes larger as the inclination departs from $\theta = \pi/2$ (i.e. as the edge becomes more approximate to a horizontal level).

The pixels whose edges have not been detected in the right-camera image 21 are permitted to have the weight $W_\theta$ of a zero value (zero degree of contribution). This is because the pixels whose edges have not been detected have a high tendency of causing an error in the disparity calculation based on stereo matching, compared to the pixels whose edges have been detected.

The edge detection in the right-camera image 21 may be performed using a known method, such as a method of using a Sobel Filter. Further, the timing of performing the edge detection may be the point of acquiring the right-camera image 21 at step 105. Alternatively, the edge detection may be conducted of the block area 40 at the point of starting step 135.

Subsequent to step 135, control proceeds to step 140 where the weights $W_X$, $W_I$, $W_Z$ and $W_\theta$ calculated at steps 120, 125, 130 and 135 are integrated. Specifically, for each of weight-calculation-target pixels in the block area 40 of this cycle, a product $W_0 = W_X \times W_I \times W_Z \times W_\theta$ of the weights $W_X$, $W_I$, $W_Z$ and $W_\theta$ of the pixel is ensured to be a final weight of the pixel.

It should be noted that, according to such an integration method, the final weight $W_0$ is necessarily zero if any one of the weights $W_X$, $W_I$, $W_Z$ and $W_\theta$ is zero. Accordingly, when the fourth weight $W_\theta$ is concerned, the weight $W_0$ will be zero for an edge whose edge has not been detected.

The arithmetic circuit 3 performs steps 115 to 140 described above to function as the weight determination section (33).

At the subsequent step 145, the disparity of the correction-target pixel 41 of this cycle is corrected using weighted average that uses the weight $W_0$ integrated at step 140. The arithmetic circuit 3 performs step 145 to function as the disparity map correction section.

Specifically, when the disparity of the pixel of the image coordinate value (x', y') calculated at immediately preceding step 110 is represented by dx'y', and the disparity of the pixel of the image coordinate value (x, y) after correction is represented by $f_{xy}$, $f_{xy}$ is calculated as follows:

$$f_{xy} = \frac{\sum_{x'=x-R}^{x+R} \sum_{y'=y-R}^{y+R} W_X(x, y, x', y')}{\sum_{x'=x-R}^{x+R} \sum_{y'=y-R}^{y+R} W_X(x, y, x', y')} \quad \text{Math. 5}$$

$$W_I(I_{xy}, I_{x'y'}) W_Z(Z_{xy}, Z_{x'y'}) W_\theta(\theta_{x'y'}) d_{x'y'}$$

$$W_I(I_{xy}, I_{x'y'}) W_Z(Z_{xy}, Z_{x'y'}) W_\theta(\theta_{x'y'})$$

It should be noted that the double $\Sigma$ in the mathematical expression means that a sum is calculated for all of the weight-calculation-target pixels in the block area 40 of this cycle. Accordingly, when the block area 40 is an area of 9-row×9-column pixels, R is equivalent to an amount representing four pixels.

At step 150, it is determined whether or not all the pixels to be targeted (all the pixels in the right-camera image 21) have been targeted as correction-target pixels. If the determination is no, control returns to step 115. If the determination is yes, the disparity map after correction is recorded on the RAM of the memory 4, and then the process shown in FIG. 2 is terminated.

In this way, the processing of steps 115 to 150 is executed by the number of times equal to the number of pixels of the right-camera image 21, for the correction of the disparity of each of the pixels.

The disparity map obtained as a result of such a correction may be used in any application. Let us take as an example a situation where the disparity map generation system related to the present embodiment is installed in a vehicle, and the right- and left-cameras 1 and 2 are mounted to the right and left ends of the windshield of the vehicle, respectively, so that the right- and left-cameras 1 and 2 are both ensured to pick up an image ahead of the vehicle. In such a case, a distance from the own vehicle to an obstacle may be ensured to be detected on the basis of the disparity map.

In the foregoing embodiment, the image acquisition section 31, the disparity map generation section 32, the weight determination section 33, and the disparity map generation section 32 of the arithmetic circuit 3 respectively correspond to the image acquiring means, the disparity map generating means, the weight determining means, and the disparity map generating means.

OTHER EMBODIMENTS

An embodiment of the present invention has so far been described. However, the scope of the present invention should not be construed as being limited to the foregoing embodiment, but may encompass various modes that can implement the functions of the invention-defining matters of the present invention. For example, the following modes may be encompassed.

(1) At step 140 of the foregoing embodiment, the amount $W_0=W_X \times W_I \times W_Z \times W_\theta$ resulting from multiplication of the weights $W_X$, $W_I$, $W_Z$ and $W_\theta$ with each other is treated as a final weight for use in the weighted average. However, the final weight does not have to be necessarily obtained in this way. For example, any one of the weights $W_X$, $W_I$, $W_Z$ and $W_\theta$ may be used as a finally used weight, or any two of the weights $W_X$, $W_I$, $W_Z$ and $W_\theta$ may be selected and multiplied with each other for use as a final weight.

(2) In the disparity map of the foregoing embodiment, each of the pixels of the right-camera image 21 is correlated with the disparity of a corresponding one of the pixels. However, in the disparity map, each of the pixels of the left-camera image 22 may be correlated with the disparity of a corresponding one of the pixels. Alternatively, an image from an intermediate viewpoint may be virtually produced on the basis of the difference in the disparity between the right- and left-camera images 21 and 22, and each of the pixels in the virtually produced image may be correlated with the disparity of a corresponding one of the pixels.

(3) In the foregoing embodiment, the individual functions are realized by having the arithmetic circuit 3 executed the program. However, these functions may be ensured to be realized by means of hardware having these functions (e.g., FPGA that can program the circuit configuration).

REFERENCE SIGNS LIST

1, 2 . . . Camera
3 . . . Arithmetic circuit
21, 22 . . . Camera image
31 . . . Image acquisition section
32 . . . Disparity map generation section
33 . . . Weight determination section
34 . . . Disparity map correction section

What is claimed is:

1. An apparatus for generating a disparity map, the apparatus comprising:
    means for acquiring a first image and a second image which are picked up from mutually different viewpoints by respective cameras;
    means for generating a disparity map that includes disparity expressed in terms of a difference in pixel positions between each of pixels and a corresponding one of pixels in the first image and the second image, respectively, as acquired;
    means for determining a weight that serves as a degree of contribution to disparity correction, for a correction-target pixel or weight-calculation-target pixels composed of surrounding pixels that are present around the correction-target pixel; and
    means for correcting the disparity of the correction-target pixel, using weighted average based on the determined weight; wherein
    the determining means is configured to determine a weight of each of the weight-calculation-target pixels on the basis of a luminance value of the correction-target pixel and a luminance value of each of the weight-calculation-target pixels in the first image; and
    the determining means is configured to reduce the weight of the weight-calculation-target pixel more, as a difference between the luminance value of the correction-target pixel and the luminance value of the weight-calculation-target pixel becomes larger.

2. The apparatus for generating a disparity map according to claim 1, wherein the determining means is configured to reduce the weight of the weight-calculation-target pixel more, as a distance on an image coordinate becomes larger between the correction-target pixel and the weight-calculation-target pixel.

3. The apparatus for generating a disparity map according to claim 2, wherein the determining means is configured to reduce the weight of the weight-calculation-target pixel more, as a difference becomes larger between a disparity of the correction-target pixel and a disparity of the weight-calculation-target pixel.

4. The apparatus for generating a disparity map according to claim 3, wherein:
    the generating means is configured to search through the second image for a pixel to be correlated to a mark pixel in the first image, at the same vertical level as the mark pixel; and
    the determining means is configured to reduce the weight of the weight-calculation-target pixel more, as an inclination of an edge detected at a position of the weight-calculation-target pixel is closer to a horizontal level.

5. The apparatus for generating a disparity map according to claim 3, wherein the determining means is configured to determine whether or not an edge is detected at a position of the weight-calculation-target pixel, and when the edge is determined not to have been detected, set the weight of the weight-calculation-target pixel to be zero.

6. The apparatus for generating a disparity map according to claim 1, wherein the determining means is configured to reduce the weight of the weight-calculation-target pixel more, as a difference becomes larger between a disparity of the correction-target pixel and a disparity of the weight-calculation-target pixel.

7. The apparatus for generating a disparity map according to claim 1, wherein:
    the generating means is configured to search through the second image for a pixel to be correlated to a mark pixel in the first image, at the same vertical level as the mark pixel; and
    the determining means is configured to more reduce the weight of the weight-calculation-target pixel, as an inclination of an edge detected at a position of the weight-calculation-target pixel is closer to a horizontal level.

8. The apparatus for generating a disparity map according to claim 1, wherein the determining means is configured to determine whether or not an edge is detected at a position of the weight-calculation-target pixel, and when the edge is determined not to have been detected, set the weight of the weight-calculation-target pixel to be zero.

9. An apparatus for generating a disparity map, the apparatus comprising:
    means for acquiring a first image and a second image which are picked up from mutually different viewpoints by respective cameras;
    means for generating a disparity map that includes disparity expressed in terms of a difference in pixel positions between each of pixels and a corresponding one of pixels in the first image and the second image, respectively, as acquired;
    means for determining a weight that serves as a degree of contribution to disparity correction, for a correction-target pixel or weight-calculation-target pixels composed of surrounding pixels that are present around the correction-target pixel; and means for correcting the disparity of the correction-target pixel, using weighted average based on the determined weight; wherein the determining means is configured to more reduce the weight of the weight-calculation-target pixel, as a distance on an image coordinate becomes larger between the correction-target pixel and the weight-calculation-target pixel.

10. An apparatus for generating a disparity map, the apparatus comprising:

means for acquiring a first image and a second image which are picked up from mutually different viewpoints by respective cameras;

means for generating a disparity map that includes disparity expressed in terms of a difference in pixel positions between each of pixels and a corresponding one of pixels in the first image and the second image, respectively, as acquired;

means for determining a weight that serves as a degree of contribution to disparity correction, for a correction-target pixel or weight-calculation-target pixels composed of surrounding pixels that are present around the correction-target pixel; and means for correcting the disparity of the correction-target pixel, using weighted average based on the determined weight; wherein the determining means is configured to reduce the weight of the weight-calculation-target pixel more, as a difference becomes larger between a disparity of the correction-target pixel and a disparity of the weight-calculation-target pixel.

11. An apparatus for generating a disparity map, the apparatus comprising:

means for acquiring a first image and a second image which are picked up from mutually different viewpoints by respective cameras;

means for generating a disparity map that includes disparity expressed in terms of a difference in pixel positions between each of pixels and a corresponding one of pixels in the first image and the second image, respectively, as acquired;

means for determining a weight that serves as a degree of contribution to disparity correction, for a correction-target pixel or weight-calculation-target pixels composed of surrounding pixels that are present around the correction-target pixel; and means for correcting the disparity of the correction-target pixel, using weighted average based on the determined weight; wherein the generating means is configured to search through the second image for a pixel to be correlated to a mark pixel in the first image, at the same vertical level as the mark pixel; and the determining means is configured to reduce the weight of the weight-calculation-target pixel more, as an inclination of an edge detected at a position of the weight-calculation-target pixel is closer to a horizontal level.

12. An apparatus for generating a disparity map, the apparatus comprising:

means for acquiring a first image and a second image which are picked up from mutually different viewpoints by respective cameras;

means for generating a disparity map that includes disparity expressed in terms of a difference in pixel positions between each of pixels and a corresponding one of pixels in the first image and the second image, respectively, as acquired;

means for determining a weight that serves as a degree of contribution to disparity correction, for a correction-target pixel or weight-calculation-target pixels composed of surrounding pixels that are present around the correction-target pixel; and means for correcting the disparity of the correction-target pixel, using weighted average based on the determined weight; wherein the determining means is configured to determine whether or not an edge is detected at a position of the weight-calculation-target pixel, and when the edge is determined not to have been detected, set the weight of the weight-calculation-target pixel to be zero.

13. A non-transitory computer readable medium comprising instructions for allowing a disparity map generation apparatus to function as:

means for acquiring a first image and a second image which are picked up from mutually different viewpoints by cameras;

means for generating a disparity map that includes disparity expressed in terms of a difference in pixel positions between each of pixels and a corresponding one of pixels in the first image and the second image, respectively, as acquired;

means for determining a weight that serves as a degree of contribution to correction, for a correction-target pixel or weight-calculation-target pixels composed of surrounding pixels that are present around the correction-target pixel; and means for correcting the disparity of the correction-target pixel, using weighted average based on the determined weight; wherein the determining means is configured to determine a weight of each of the weight-calculation-target pixels on the basis of a luminance value of the correction-target pixel and a luminance value of each of the weight-calculation-target pixels in the first image; and the determining means is configured to reduce the weight of the weight-calculation-target pixel more, as a difference between the luminance value of the correction-target pixel and the luminance value of the weight-calculation-target pixel becomes larger.

14. An apparatus for generating a disparity map, the apparatus comprising:

means for acquiring a first image and a second image which are picked up from mutually different viewpoints by respective cameras;

means for generating a disparity map that includes disparity expressed in terms of a difference in pixel positions between each of pixels and a corresponding one of pixels in the first image and the second image, respectively, as acquired;

means for determining a weight that serves as a degree of contribution to disparity correction, for a correction-target pixel or weight-calculation-target pixels composed of surrounding pixels that are present around the correction-target pixel; and means for correcting the disparity of the correction-target pixel, using weighted average based on the determined weight; wherein the determining means is configured to determine a weight of each of the weight-calculation-target pixels on the basis of a luminance value of the correction-target pixel and a luminance value of each of the weight-calculation-target pixels in the first image; and the determining means is configured to reduce the weight of the weight-calculation-target pixel more, as a distance on an image coordinate becomes larger between the correction-target pixel and the weight-calculation-target pixel.

15. An apparatus for generating a disparity map, the apparatus comprising:
   means for acquiring a first image and a second image which are picked up from mutually different viewpoints by respective cameras;
   means for generating a disparity map that includes disparity expressed in terms of a difference in pixel positions between each of pixels and a corresponding one of pixels in the first image and the second image, respectively, as acquired;
   means for determining a weight that serves as a degree of contribution to disparity correction, for a correction-target pixel or weight-calculation-target pixels composed of surrounding pixels that are present around the correction-target pixel; and
   means for correcting the disparity of the correction-target pixel, using weighted average based on the determined weight; wherein
   the determining means is configured to determine a weight of each of the weight-calculation-target pixels on the basis of a luminance value of the correction-target pixel and a luminance value of each of the weight-calculation-target pixels in the first image; and
   the determining means is configured to reduce the weight of the weight-calculation-target pixel more, as a difference becomes larger between a disparity of the correction-target pixel and a disparity of the weight-calculation-target pixel.

16. An apparatus for generating a disparity map, the apparatus comprising:
   means for acquiring a first image and a second image which are picked up from mutually different viewpoints by respective cameras;
   means for generating a disparity map that includes disparity expressed in terms of a difference in pixel positions between each of pixels and a corresponding one of pixels in the first image and the second image, respectively, as acquired;
   means for determining a weight that serves as a degree of contribution to disparity correction, for a correction-target pixel or weight-calculation-target pixels composed of surrounding pixels that are present around the correction-target pixel; and
   means for correcting the disparity of the correction-target pixel, using weighted average based on the determined weight; wherein
   the determining means is configured to determine a weight of each of the weight-calculation-target pixels on the basis of a luminance value of the correction-target pixel and a luminance value of each of the weight-calculation-target pixels in the first image; and
   the generating means is configured to search through the second image for a pixel to be correlated to a mark pixel in the first image, at the same vertical level as the mark pixel; and
   the determining means is configured to reduce the weight of the weight-calculation-target pixel more, as an inclination of an edge detected at a position of the weight-calculation-target pixel is closer to a horizontal level.

17. An apparatus for generating a disparity map, the apparatus comprising:
   means for acquiring a first image and a second image which are picked up from mutually different viewpoints by respective cameras;
   means for generating a disparity map that includes disparity expressed in terms of a difference in pixel positions between each of pixels and a corresponding one of pixels in the first image and the second image, respectively, as acquired;
   means for determining a weight that serves as a degree of contribution to disparity correction, for a correction-target pixel or weight-calculation-target pixels composed of surrounding pixels that are present around the correction-target pixel; and
   means for correcting the disparity of the correction-target pixel, using weighted average based on the determined weight; wherein
   the determining means is configured to determine a weight of each of the weight-calculation-target pixels on the basis of a luminance value of the correction-target pixel and a luminance value of each of the weight-calculation-target pixels in the first image; and
   the determining means is configured to determine whether or not an edge is detected at a position of the weight-calculation-target pixel, and when the edge is determined not to have been detected, set the weight of the weight-calculation-target pixel to be zero.

* * * * *